Dec. 6, 1955   R. H. GOODRICH ET AL   2,726,064
DRILLING AND CONVEYING APPARATUS
Filed May 24, 1949   8 Sheets-Sheet 1
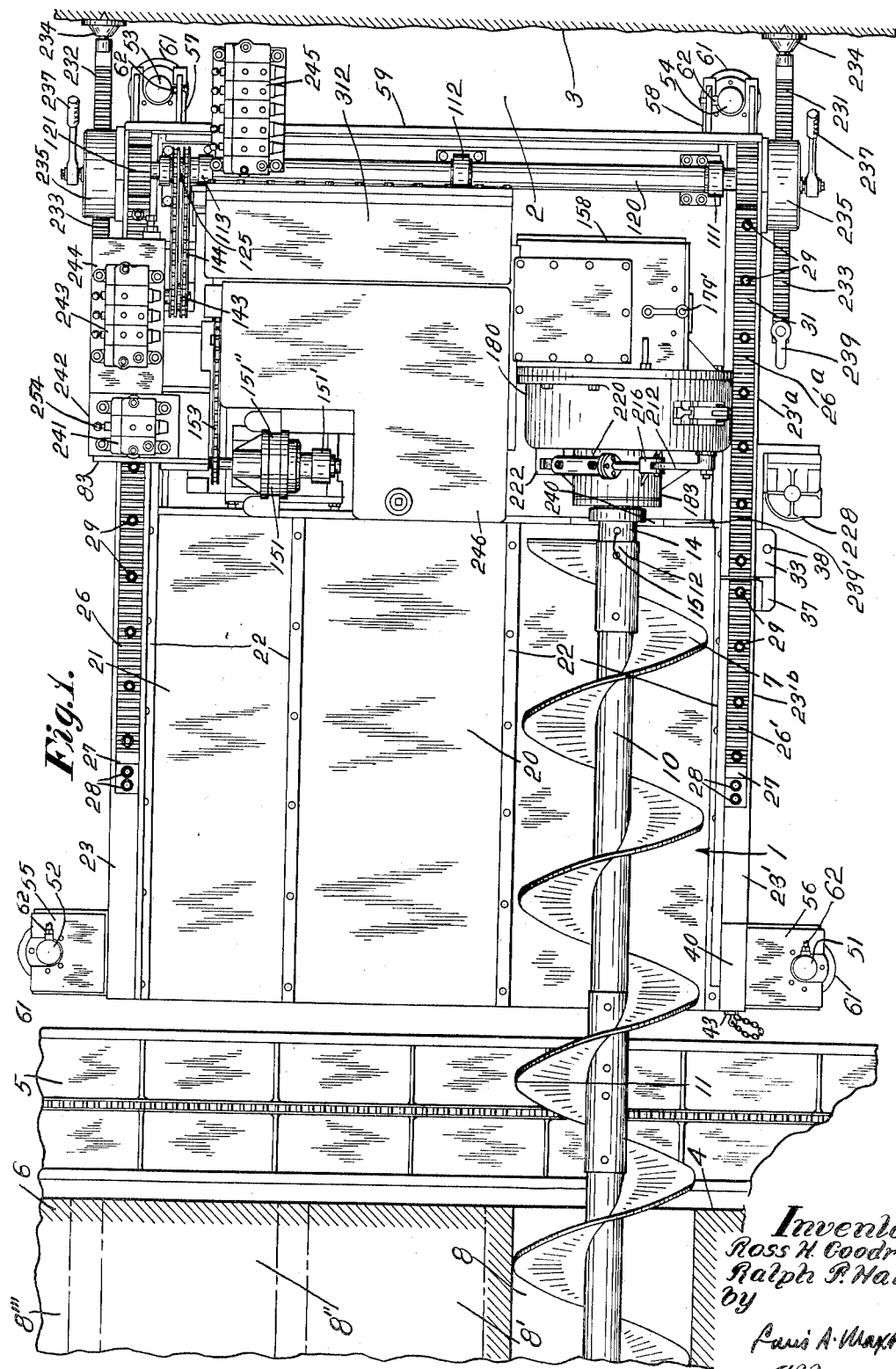
Inventors:
Ross H. Goodrich.
Ralph P. Hale.
by
Paris A. Maxton.
Attorney.

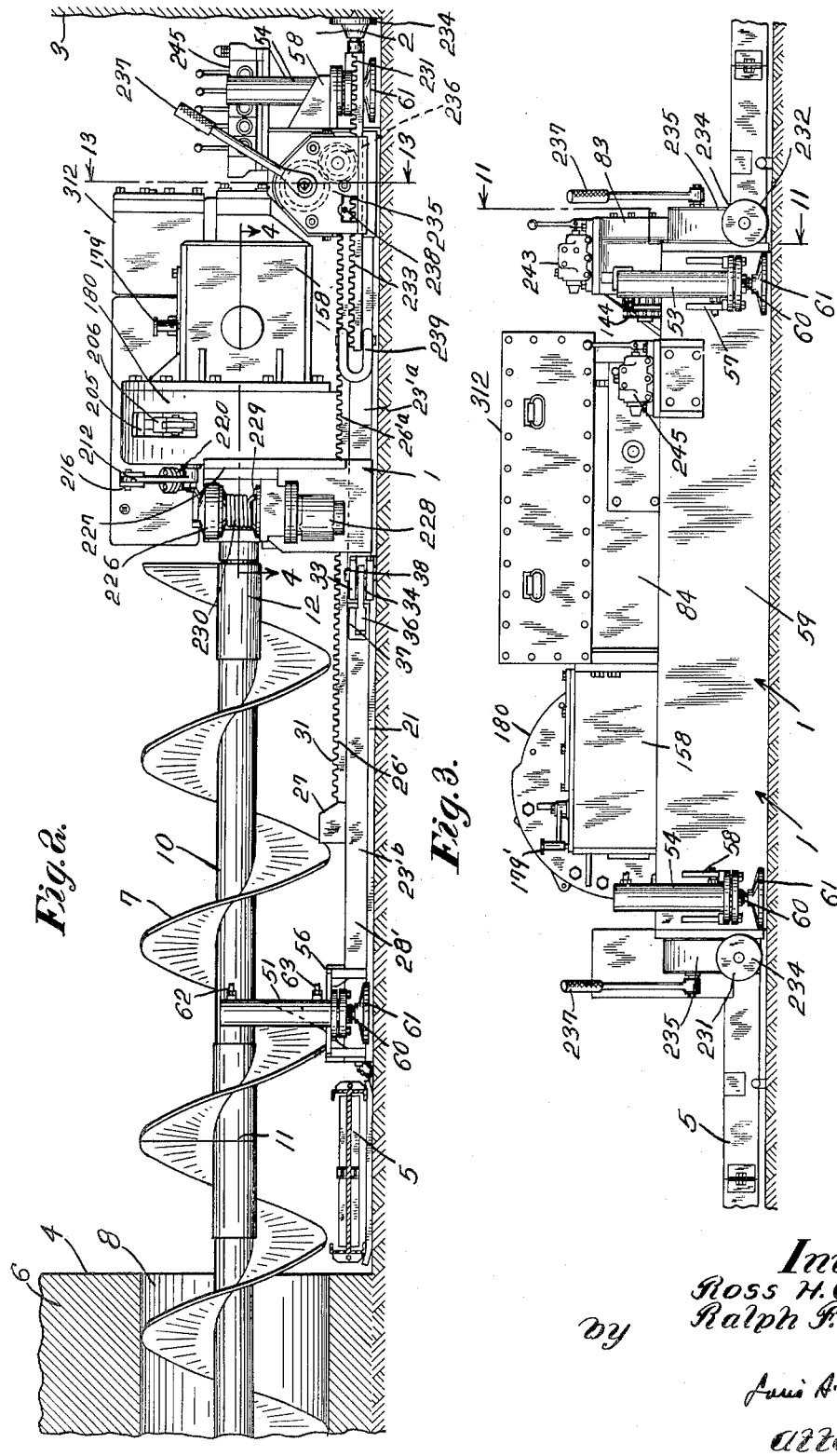

Dec. 6, 1955　　　R. H. GOODRICH ET AL　　　2,726,064
DRILLING AND CONVEYING APPARATUS
Filed May 24, 1949　　　　　　　　　　　　　　　8 Sheets-Sheet 3
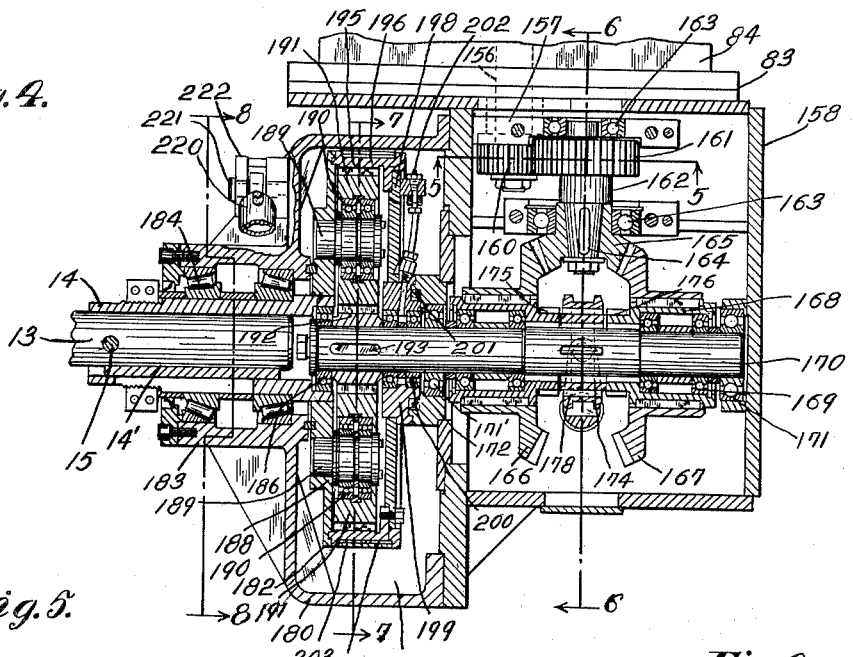
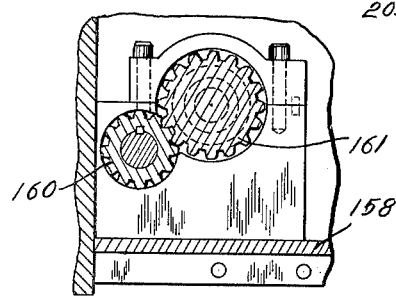
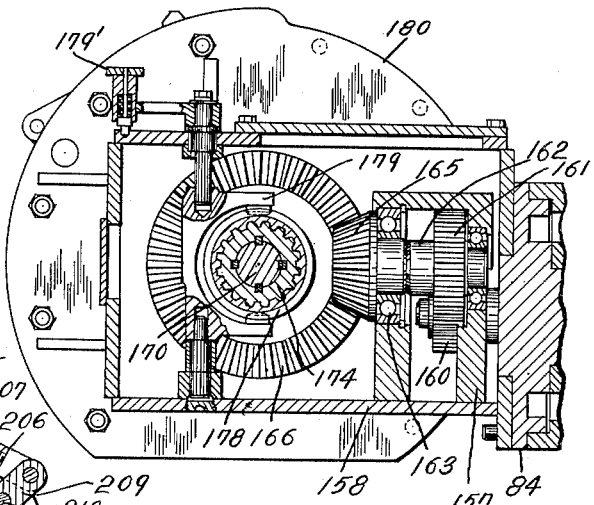
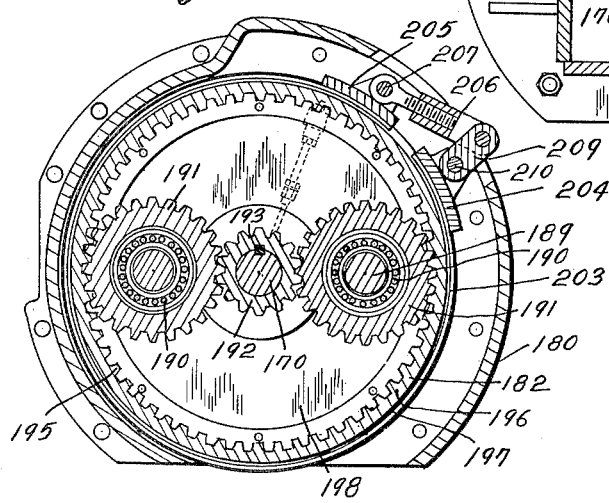
Inventors:
Ross H. Goodrich.
Ralph P. Hale.
by Louis A. Maxam.
Attorney.

Dec. 6, 1955     R. H. GOODRICH ET AL     2,726,064
DRILLING AND CONVEYING APPARATUS
Filed May 24, 1949     8 Sheets-Sheet 4
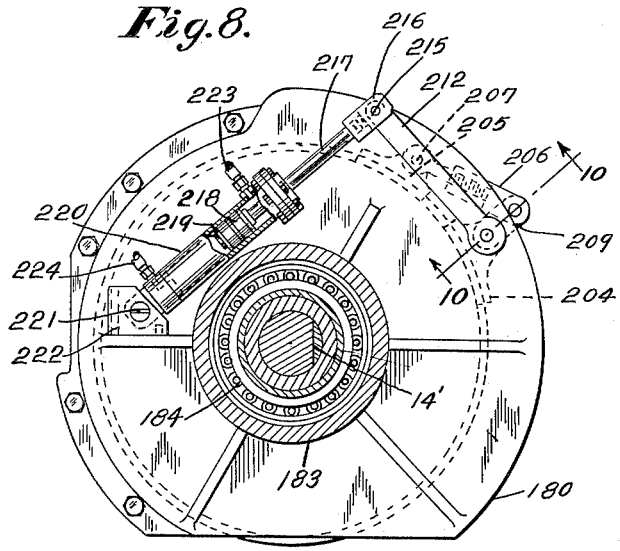
Fig. 8.
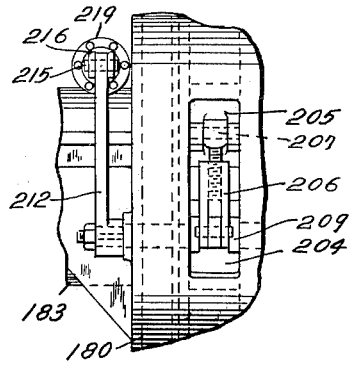
Fig. 9.
Fig. 10.
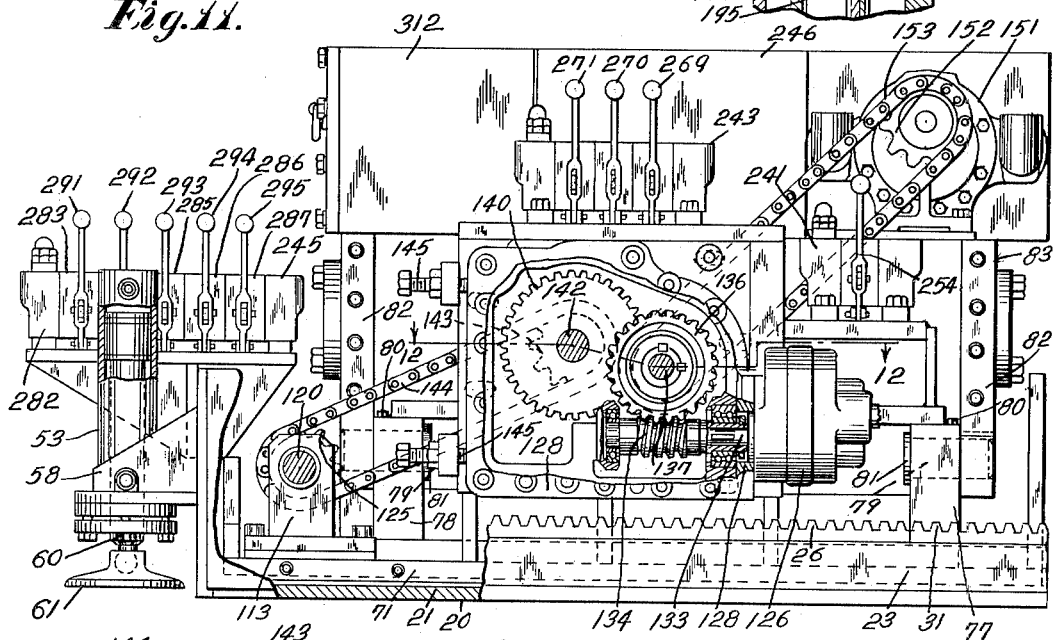
Fig. 11.
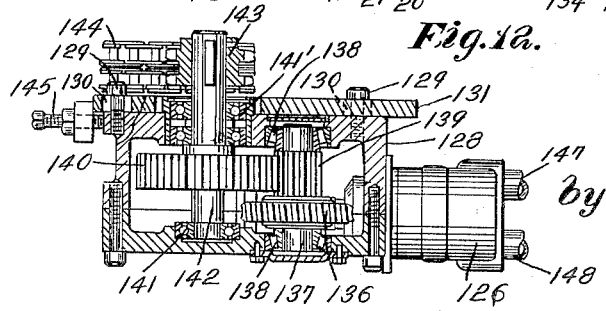
Fig. 12.
Inventors:
Ross H. Goodrich
Ralph P. Hale.
by
Louis A. Maxon.
Attorney.

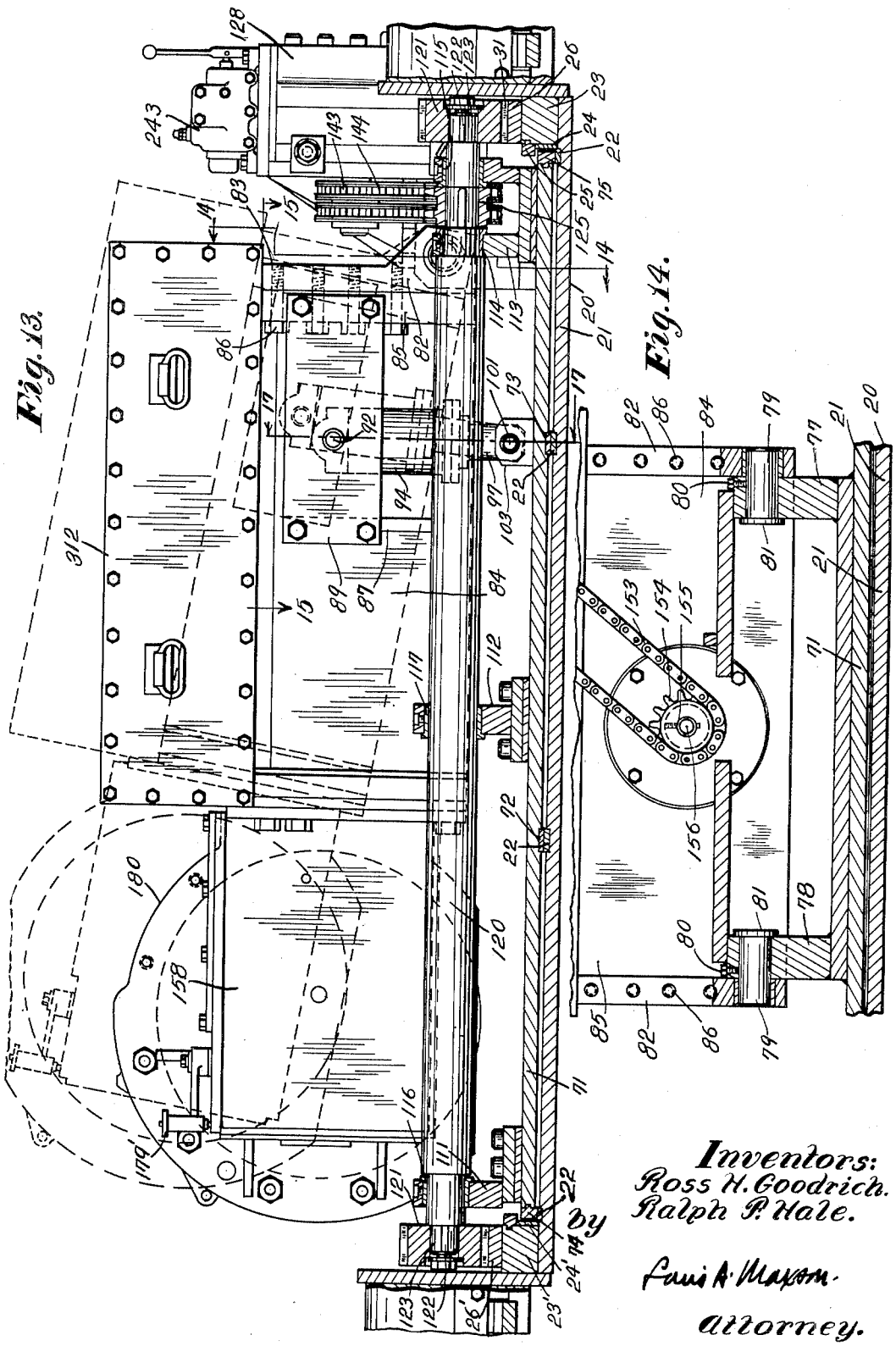

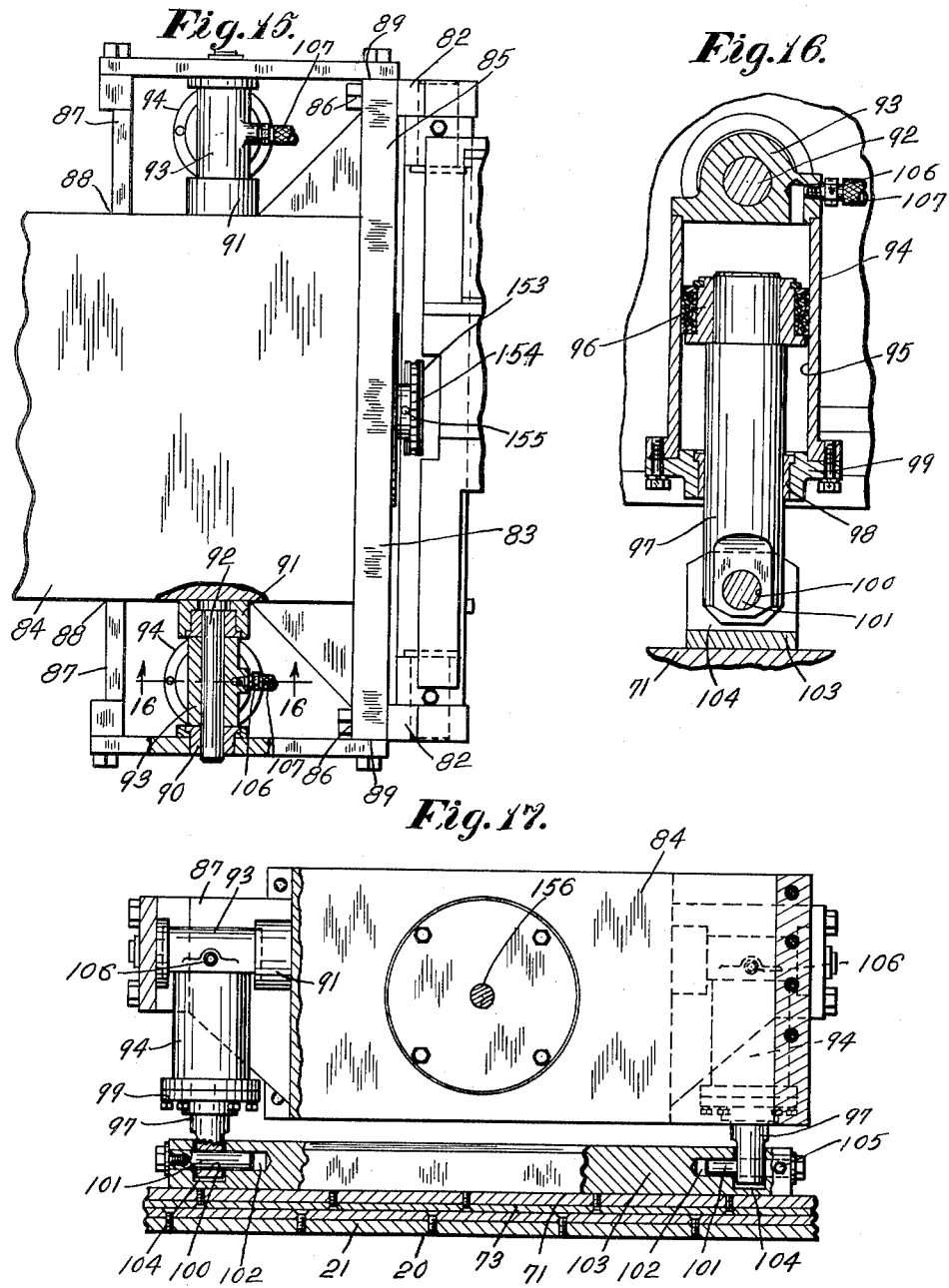

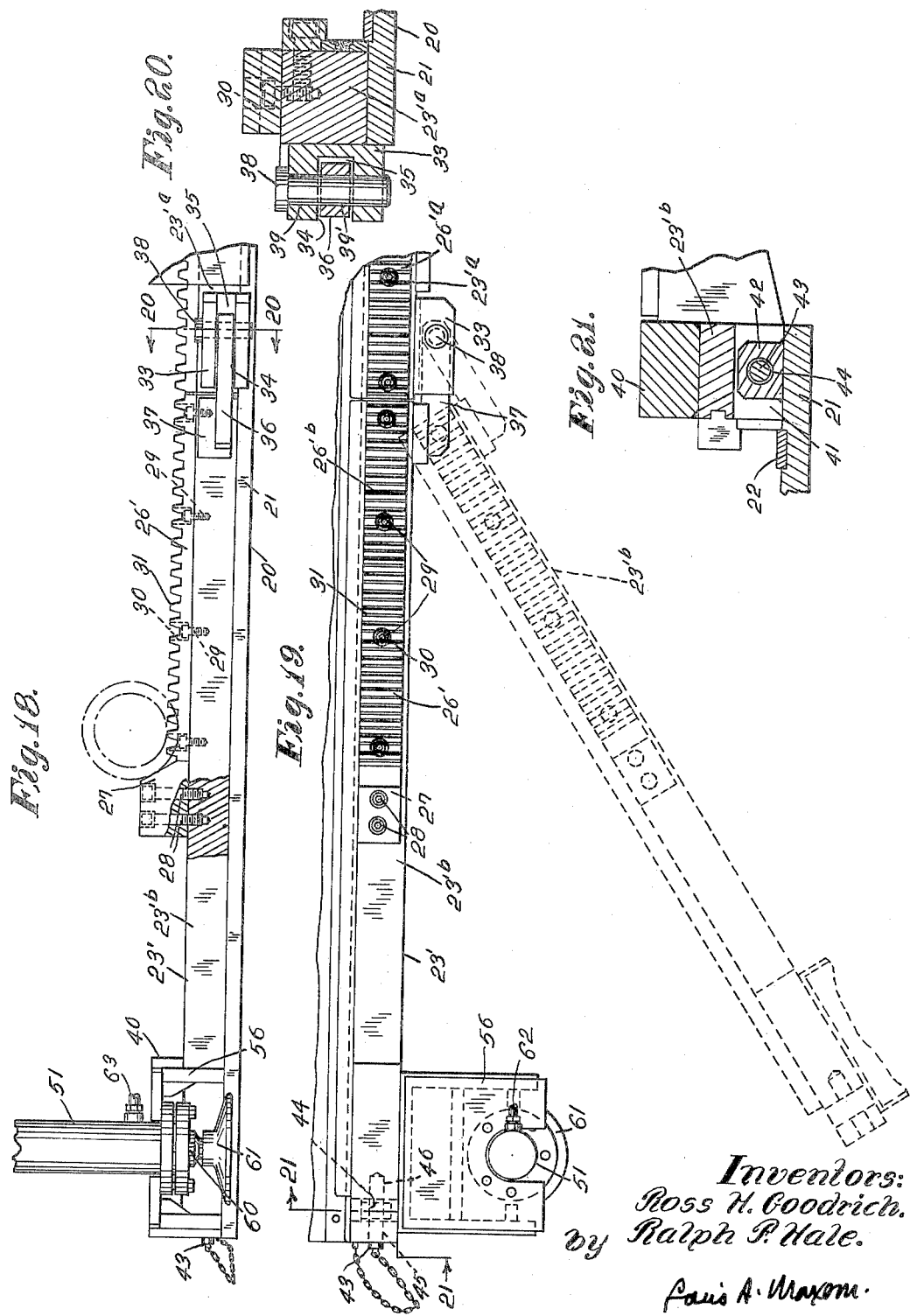

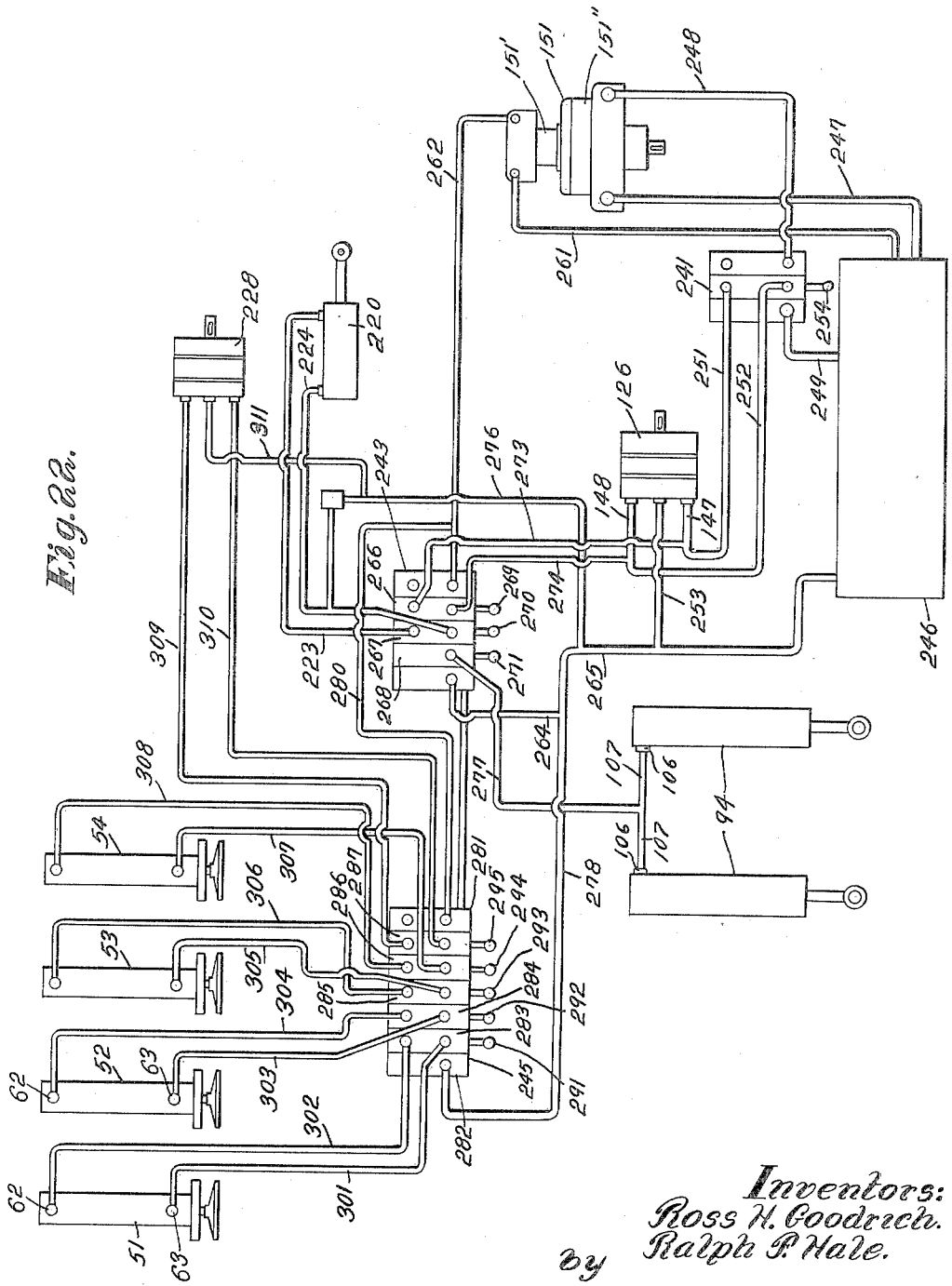

United States Patent Office 2,726,064
Patented Dec. 6, 1955

2,726,064

DRILLING AND CONVEYING APPARATUS

Ross H. Goodrich and Ralph F. Hale, Claremont, N. H., assignors to Joy Manufacturing Company, Pittsburgh, Pa., a corporation of Pennsylvania Application May 24, 1949, Serial No. 96,387

2 Claims. (Cl. 255—20)

Our invention relates to drilling apparatus, and more particularly to drilling apparatus adapted to the mining of thin seams of coal.

There is much coal available, both in strip pit mines and further underground, which occurs in seams so thin as to make its mining, in the one case following overburden removal and in the other by undercutting machines and by blasting, relatively impracticable. There are also coal seams where the roof conditions are such as to make conventional systems of mining impracticable. It is possible, by providing drilling apparatus of a kind which employs a drilling implement of a diameter relatively close to the thickness of the seam, and having a helix associated therewith for moving the disintegrated coal out of the hole, and by spacing the holes formed by this apparatus in such a manner as to provide the requisite support for the roof or overburden, as the case may be, to remove or mine out a very satisfactory part of the coal under conditions such as are above mentioned.

It is an object of our invention to provide an improved coal mining apparatus of the character mentioned. It is another object of our invention to provide an improved apparatus of the character mentioned having an improved feeding means for the drilling and coal removing apparatus. It is a further object of our invention to provide an improved mining apparatus of the character mentioned having an improved means for increasing the length of the drililng and material conveying apparatus as the hole deepens. It is still another object of our invention to provide an improved apparatus of the character mentioned having an improved means for locating the coal drilling and removal apparatus at a proper elevation.

Other and more general objects of the invention are to improve the construction, and in consequence thereof the operation, of machines for mining coal and other solid materials that occur in veins, of the type in which the material is freed from the latter at a considerable distance from the free face and is concurrently moved to transportation equipment; and to improve the construction and consequent operation of units that may advantageously be incorporated in such machines—to the end that coal or other material in thin seams may be mined rapidly and economically in desired form.

Specific objects of the invention will appear from the ensuing description of it.

In a preferred embodiment of the invention there may be included, as will later appear, a base preferably having supporting means permitting its disposition in desired planes. Desirably the base may have associated with it means for transmitting the drilling reaction to a stationary wall or abutment in the mine. The base may desirably support a carriage, and feeding means may be provided between the base and the carriage, rack and pinion type feeding means forming a desirable arrangement. When this character of feeding means is adopted, one of the rack-ways, if these are located at the edges of the base, may desirably be so formed as to permit its movement to a position which will permit a conveyor screw or helix section to be rolled onto the base without possibility of damage to the rack-way. Desirably, the drilling and conveying apparatus may be supported for vertical adjustment on a carriage movable along the base. A desirable mode for providing such an adjustment consists in mounting the driving and supporting means for the drilling and conveying apparatus pivotally on the carriage. The driving and supporting means may desirably include a friction controlled speed reducing mechanism. Feeding means may desirably include hydraulic devices, with pumps of markedly different displacements being provided, one with a small displacement for effecting the relatively slow feed of a drilling and conveying mechanism during the mining operation, and another of considerably larger displacement, for use when higher speed feeding—or retraction—is desired, or in freeing a stuck drill or boring head. Desirably, means may be provided, in the form of a hydraulically operated hoisting device to assist in handling the conveyor sections. Details of the invention in its preferred embodiment will be described in the following portions of the specification.

In the accompanying drawings, in which one illustrative embodiment of the invention is shown for purposes of illustration:

Fig. 1 is a top plan view of a drilling apparatus constructed in accordance with the illustrative embodiment of the invention, and illustrated as in use, Fig. 2 is a side elevational view of the apparatus shown in Fig. 1, Fig. 3 is an end view of the apparatus shown in Fig. 1, looking at the latter from the right hand end of Fig. 1, Fig. 4 is a horizontal sectional view on an enlarged scale, and on the plane of section line 4—4 of Fig. 2, showing details of the drive mechanism for the auger, Fig. 5 is a fragmentary sectional view, on the plane of the section line 5—5 of Fig. 4, Fig. 6 is a vertical sectional view on the plane of the section line 6—6 of Fig. 4, showing details of the reverse drive of the drilling and conveying apparatus, Fig. 7 is a vertical sectional view on the plane of the line 7—7 of Fig. 4, showing a friction band controlled planetary mechanism embodied in the drive last mentioned, Fig. 8 is a vertical section on the section line 8—8 of Fig. 4, showing a hydraulic control for the friction band of the planetary mechanism, Fig. 9 is a fragmentary elevational view of a portion of the hydraulically controlled friction band, portions of which are shown in Figs. 7 and 8., Fig. 10 is a fragmentary section on the line 10—10 of Fig. 8, Fig. 11 is an enlarged fragmentary sectional view on the vertical planes of the section line 11—11 of Fig. 3, with parts broken away, Fig. 12 is a sectional view, with parts shown in full, taken on the planes of the section line 12—12 of Fig. 11, Fig. 13 is an enlarged sectional view on the plane of the line 13—13 of Fig. 2, Fig. 14 is a fragmentary sectional view on the planes of the line 14—14 of Fig. 13, Fig. 15 is a fragmentary plan view with parts broken away and other parts shown in full, on the section line 15—15 of Fig. 13, Fig. 16 is an enlarged vertical sectional view on the plane of line 16—16 of Fig. 15, showing a tilting jack, Fig. 17 is a fragmentary view, with parts broken away, on the plane of the section line 17—17 of Fig. 13, Fig. 18 is an enlarged, fragmentary, side elevational view of a portion of the rack and pinion feeding mechanism, with parts broken away to show a detail of construction, one of the leveling jacks being shown, Fig. 19 is a plan view of the structure shown in Fig. 18, Fig. 20 is an enlarged cross-section on the plane of the section line 20—20 of Fig. 18, Fig. 21 is an enlarged cross-section on the section line 21—21 of Fig. 19, and Fig. 22 is a hydraulic diagram of the apparatus.

Referring to the drawings, and at first particularly to Figs. 1 and 2, it may be noted that the illustrative embodiment of the apparatus which forms the subject matter of this invention, and which is designated generally 1, is arranged in an entry 2 having walls or ribs 3 and 4. A conveyor 5, shown diagrammatically as a flight conveyor, is arranged between the rib 4 and the apparatus 1 in order that material removed from a vein 6 bounded by the rib 4 may be deposited on the conveyor as it is brought out by a helix or screw 7, which forms a portion of the apparatus. Holes or bores 8 of a diameter closely approximating the thickness of the seam may be formed in close adjacency to each other, one hole, the one designated 8, being shown in the process of formation, and holes to be formed thereafter being indicated in broken lines at 8', 8" and 8'". It will be appreciated that the holes may be formed in a series proceeding in the other direction along the face, by using a helix (and boring device) of reverse hand and driving it in the opposite direction. The helix or screw 7 is supported on a sectional shaft 10, which carries at its left hand end in Fig. 1 a suitable drilling head or auger (not shown). These drilling heads are well known and may assume various forms, and it is therefore unnecessary to illustrate such a head. The sectional shaft 10 is jointed, as indicated at 11, and the different sections may be connected by pin and socket joints of well known construction. One arrangement of such joint is shown at 12 in Fig. 1, and, as shown in Fig. 4, the pin portion 13 of this joint may be extended into a drive sleeve 14, whose drive is later described, and may receive such drive from the drive sleeve 14, by reason of its flattened side 14' (see Fig. 8); and a pin 15 holds the pin portion 13 and the drive sleeve 14 together.

The apparatus 1 includes a base or base portion 20. This base portion includes a bottom plate or base plate 21 provided as herein illustrated with four guide strips 22 extending longitudinally thereof (see Fig. 13). Along one edge of this base frame there extends in fixed relation thereto a bar 23, to the inner face of which there is secured a wear strip 24 (see Fig. 13) and a top guide strip or hold down gib 25. The bar 23 carries a rackway 26 (see Fig. 1). At the forward end of the rackway, there is a stop portion 27, held to the bar 23 by screws 28. The rack-bar is secured to its side bar 23, at various points along its length, by screws 29 mounted in recesses 30, so that their tops come below the bottoms of the teeth 31 of the rack bar. The construction at the left hand side of the machine, looking forwardly, is the same, with the exception of the fact that the side bar 23' and wear strip 24' are formed in two pieces and that the rack bar 26' is formed in two pieces. The rearward portions 23'ᵃ and 26'ᵃ (as shown in Fig. 20) are rigidly secured to the base plate, and a block 33 is secured to the bar 23'ᵃ and to the base plate 21, and is grooved as at 34 to form a recess 35 in which there is received an ear 36 formed on the end of a bracket 37 secured to a bar portion 23'ᵇ. A pivot pin 38 traverses openings 39 and 39' respectively formed in the block 33 and in the ear 36. The free end of the bar portion 23'ᵇ is suitably secured as by welding, to a support member 40, and has a downwardly opening transverse recess 41 (see Fig. 21) therein adapted to pass over an upstanding ear 42 secured to the bottom plate 21, and a pin 43 is adapted to extend into an opening 44 in the upstanding alined ear and into alined openings 45 and 46 in the bar portion 23'ᵇ, to hold the rack portion 26'ᵇ in alinement with the rack portion 26'ᵃ, and the bar portion 23'ᵇ with the bar portion 23'ᵃ.

Arranged at the four corners of the base (see Fig. 1) there are hydraulic leveling jacks—those at the forward end being designated 51 and 52, and those at the rearward end being designated 53 and 54. The jack 52 is fixedly secured at the forward righthand corner of the bottom plate 21 by means of a bracket 55. The jack 51 is supported by means of a bracket 56 on the swinging bar portion 23'ᵇ which bracket is secured to the latter and to the support member 40. The jacks 51 and 52 are vertically disposed and extend in opposite directions from the sides of the base. The jacks 53 and 54 are supported by brackets 57 and 58 which are secured at the rearward end of the base by means of an upstanding transverse plate 59 which is rigidly secured to the base plate 21 as by welding, or in some other suitable manner. The leveling jacks are double-acting and have piston rods 60 which support at their lower ends bottom-engaging plates 61. Each jack has (see Fig. 22) a supply connection 62 for the supply of fluid to its upper end and a supply connection 63 for its lower end. Supply of fluid to the connections 62 extends the jacks, while supply of fluid to the connections 63 effects collapse of the jacks. The jacks are individually controlled by separate valves as will later appear.

Mounted on the base plate for movement longitudinally thereof is a carriage 71 (see Fig. 13). This carriage has strips 72 and 73 secured to its lower side and slidably engaging the central pair of strips 22 carried by the base 20, and it has edge strips or gibs 74 and 75 which engage the other strips 22 and the side strips or gibs 24 and 24'. The carriage is provided with upstanding bearing blocks 77 and 78 (as shown in Fig. 14). Through these there extend headed, bearing-providing pins 79, held in position by set screws or the like, 80, these pins having heads 81 and projecting outwardly and extending through openings in side plates 82 forming portions of a vertically pivotable frame 83. A motor (as shown in Fig. 15), herein an electric motor 84, is provided with a transverse frame element 85, to which the members 82 are secured as at 86. A yoke-like frame 87 (see also Fig. 17) is formed at either side of the motor 84 and is secured to the side of the latter as at 88, and to the cross member or frame element 85 as at 89. These yokes each support an outer bearing bushing 90, while the motor frame supports inner bearing bushings 91. Pivot pins 92 extend through these bearing bushings and through intermediate pivot elements 93 formed on the top heads of tilting jack or lift cylinders 94 (see Fig. 16), whose bores 95 contain suitably packed pistons 96, to which piston rods 97 are secured, the piston rods 97 extending through suitable guide bushings 98 in the lower heads 99 of the cylinders 84. The lower ends of the piston rods are bored as at 100 for the reception of pivot pins 101 which are suitably mounted in bores 102 formed in a transversely extending bar or block element 103 (see Fig. 17) secured to the plate or carriage 71, which bar or block is recessed at 104, 104 to receive the lower ends of the piston rods 97. The pins 101 are secured in position as by set screws 105. Fluid supply connections 106 (see Fig. 22), to which flexible conduits 107 lead as later described, are adapted to supply fluid to, and vent fluid from, the upper ends of the cylinder bores 95.

The plate or carriage 71 supports (see Fig. 13) a plurality of bearing blocks 111, 112 and 113, the latter being a double block and supporting a pair of bushings 114 and 115 in spaced relation, while the blocks 111 and 112 have bearing bushings 116 and 117 individual to them. In these bearing bushings is rotatably supported a shaft 120 which carries spur gears 121 at its opposite ends. These spur gears are suitably fixed as by keys 122 to the reduced ends 123 of the shaft 120 and mesh with the teeth 31 of the racks 26 and 26'. Suitably secured, between the bearing bushings 114 and 115, to the shaft 120 is a double drive sprocket 125 which is driven (see Figs. 11 and 12) by a reversible hydraulic motor 126 of any suitable construction, supported by a casing 128 adjustably secured, as by screws 129 extending through slots 130, to an upright plate 131 secured in fixed relation to the carriage or plate 71. The motor 126 has a drive shaft 133 which is secured to a driving worm 134 suitably journaled in the casing 128 and meshing with a worm wheel 136 supported on a cross shaft 137 journaled as at 138 in the casing and carrying a drive pinion 139, which engages and is adapted to drive a driving gear 140. The latter is mounted in bearings 141 and 141' by means of a shaft 142 and carries a double drive sprocket 143 connected by chains 144 in driving relation with the double drive sprocket 125 previously mentioned. The tension of the chains may be adjusted by sliding the casing 128 relative to the plate 131 by the adjusting screws 145. It will thus be evident that the motor 126, which may be of any suitable form and which is, as above stated, of the reversible type and which is herein shown as of the hydraulically operated type, is adapted to feed the carriage 71 back and forth along the base 20. Fluid supply and discharge conduits 147 and 148 (see Fig. 22) are connected with the motor 126, and by the reversal of the connections of these conduits with supply and discharge forward or reverse feeding of the carriage 71 relative to the base 20 can be effected. Through the use of self locking worm gearing and/or by the use of a control valve for the conduits 147 and 148 which may lock fluid in the motor 126, the carriage may be held stationary at any desired point by interrupting the drive of the motor 126.

A hydraulic pump 151 (see Fig. 11) is mounted on the tilting frame. This is, as later more fully described a double pump, and has a small displacement section 151' and a large displacement section 151'' (see Fig. 22). This pump is driven by a sprocket 152 and sprocket chain 153 from a sprocket 154 secured as at 155 on the drive shaft 156 of the motor 84 (see Fig. 14).

The other end of the motor shaft extends as shown at 157 into a compartment or gear housing 158 secured to the tilting frame (see Fig. 4). The last mentioned end of this motor shaft carries a drive pinion 160 which meshes with and drives a gear 161 mounted on a shaft 162 journaled in bearings 163 within the gear housing 158. The shaft 162 has secured thereto at 164 a bevel drive pinion 165 which meshes with and drives oppositely facing bevel gears 166 and 167. These are rotatably supported by sleeves 168 and bearings 169 on a shaft 170, which is itself rotatably supported in bearings 171 and 171' respectively carried by the gear casing 158 and by a block 172, carried by the gear case. The shaft 170 has (see also Fig. 6) splined to it a toothed element 174 and the sleeves 168 have correspondingly toothed elements 175 and 176 secured to them, the toothed element 175 being fixed in non-rotative relation with respect to the gear 166 and the toothed element 176 fixed in non-rotative relation with the gear 167. An internally toothed clutch element 178 is interlocked with the toothed element 174 and is movable by a shipper element 179 having a manually operable adjusting and locking means 179', to connect the toothed elements 175 or 176 selectively in driving relation with the toothed member 174, so that the latter and the shaft 170 may be driven selectively in opposite directions.

Another gear box 180 (see Fig. 4) provides a chamber 181 within which there is a friction-controlled planetary mechanism 182. The casing 180 has a projecting tubular portion 183, in which combined radial and thrust bearings 184 rotatably support the drive sleeve 14 previously mentioned. This sleeve at its rearward end is provided with a bearing 186 surrounding the forward end of the shaft 170, and on its periphery it supports a planet carrier plate 188, carrying studs 189 rotatably supporting, on suitable bearings 190, spur gears 191 meshing with and driven by a spur pinion 192 keyed at 193 to the forward end of the shaft 170. The gears 191 mesh with an internal gear 195 formed integrally with a circular brake surface providing member 196. The brake surface is shown at 197. Member 196 is supported by a plate 198 which is mounted upon a rotatably supported block 199 surrounding the shaft 170 and having between the same and such shaft, bearings 200. A seal 201 is provided to prevent the escape of lubricant between the members 172 and 199. Lubricant is adapted to be supplied through a connection 202 to the bearings 200.

A friction band of suitable construction is shown at 203 surrounding the braking surface 197 (see Fig. 7). This has end elements 204 and 205, the latter adapted to be drawn towards the former by a link 206 pivotally connected at 207 to the member 205 at one end of the brake band and pivotally connected at the other end of the brake band to a lever 209. The lever 209 is supported on a cross shaft 210 (see also Figs. 8, 9 and 10) and extends through ears 211 in the end member 204, and has an elongated lever 212 connected to the projecting end thereof. The shaft 210 is journaled in the casing 180. The free end of the lever 212 has pivotally connected to it at 215 a pivot block 216 supported by the outer end of a piston rod 217. This piston rod has a piston 218 at its other end, movable in the bore 219 of a cylinder 220. The cylinder is mounted for pivotal movement on a pin 221, mounted in a block 222, carried by the gear casing 180. The cylinder 220 is, as shown, double acting and has fluid supply and exhaust connections 223 and 224. Supply of fluid to the latter applies the brake band 203 and effects the drive of the drilling and conveying mechanism. Supply of fluid to the connection 223, with venting of the connection 224, releases the brake band, and interrupts the drive of the drilling and conveying mechanism. It will be understood that a single acting cylinder, with fluid pressure application of the brake band and spring release could be employed if desired. This would make possible a control of the "dead-man" type whereby drive of the drilling and conveying mechanism is discontinued upon release of an operator's control.

A hydraulically operated hoist 226 (see Fig. 2) is mounted at 227 on a vertical plate secured to the base 20. This includes any suitable type of hydraulic driving motor 228, and a winding drum 229 suitably driven by the motor 228 and carrying a cable 230 which may be employed for handling the conveyor helices or for any other necessary and useful purpose.

Suitable abutment jacks 231 and 232 are provided at the opposite rear corners of the base plate 21 (see Fig. 1). These include rack bars 233 having abutment elements or pads 234 at their rearward ends. The rack bars extend through housings 235 (see also Figs. 2 and 3) secured to the base plate and containing ratchet controlled gearing 236, operable by a hand lever 237 to effect extension or retraction of the jacks as may be desired. These may be utilized to control the direction in horizontal planes of the advance of the apparatus and also to prevent backward sliding of the base plate 21 instead of forward feeding of the drilling and conveying apparatus during the mining operation. It will be observed that the rack bars are provided with clevises 239, so that, when (as, for example, opposite break-throughs) there is no abutment wall available for the pads 234 to engage, cables can be led forward to suitable jack pipes, and control of angle and prevention of backward sliding will still be possible. Suitable transversely slidable lock elements 238 may be slid into engagement with the rack bars 233 to hold the latter in fixed position relative to the base plate 21. It may be noted that an upright plate 239', cut away as at 240 (see Fig. 1) to permit the passage of the drive sleeve 14 is arranged in advance of the gear case portion 183.

Several hydraulic valve boxes are provided (see Fig. 22 and also Figs. 1, 2, 3, 11 and 13). The pump 151 is of the multiple unit type including as above noted a pump having a small displacement—this being identified in the drawings as 151'—and a large displacement unit, this being indicated by 151". One of the valve boxes, 241, is adapted for the sole purpose of controlling the connection of the large-displacement pump 151" with the fluid motor 126 which effects carriage feed. This valve box is mounted as at 242 on the sliding frame 71 (see Fig. 1). Another valve box 243 is mounted at 244 on the sliding frame, and this controls the distribution of fluid from the small-displacement pump 151' to the fluid motor 126, to the clutch control cylinder 220, and to the lift cylinders 94. The third valve box 245 is mounted on the base 20, and it includes a number of valve devices individual to the several leveling jacks 51, 52, 53 and 54. This third valve box also controls the supply of fluid to the winch 226.

A reservoir for hydraulic fluid is provided at 246. The fluid system may now be described in some detail.

A suction conduit 247 leads to the intake of the large-displacement pump 151". A discharge conduit 248 connects the discharge of this pump to the valve block 241. A vent conduit 249 leads from this valve block back to the reservoir 246. The valve block, as is common in many such valve blocks, has a built-in relief valve (not shown) for limiting the pressure which can be built up in the discharge conduit 248. Conduits 251 and 252 lead to the conduits 147 and 148 which, as above noted, are associated with the carriage-feed motor 126. This motor has a drain connection 253, as is conventional for such motors. A manually operated handle 254 is movable to connect through a well known form of piston type valve (not shown), enclosed within the valve box 241 the conduits 251 and 252 separately, as may be desired, with the discharge conduit 248, while it connects the one of the conduits 251, 252 not in connection with the conduit 248 to the return or vent conduit 249, when the motor 126 is being driven. The handle 254 may also be moved to shut off communication of the motor conduits 251 and 252 completely from the conduits 248 and 249. Under such circumstances, the large volume pump 151" may, in a well known manner, discharge freely to the return conduit 249. A valve device generally suitable for a control of this character may be seen in the patent to Baldwin and Vanderzee, No. 2,384,447, granted September 11, 1945. Many other suitable valve mechanisms, such as Vickers valves, are well known in the valve art.

A suction connection 261 leads from the reservoir 246 to the small-displacement pump 151', and a discharge line 262 leads from this pump to the valve box 243, which, as is the case with the valve box 241, has a built-in pressure relief valve for controlling the maximum pressure which may be built up in discharge line 262, and which also has a return connection 264 leading back to the reservoir 246 by way of a conduit 265, with which the drain conduit 253 communicates. Within the valve box 243 there are arranged three control valves of well known form each of the three adapted to permit free by-pass of fluid when in its central position, and concurrently to cut off the devices which they control from both supply and exhaust. These valve devices 266, 267 and 268, have control handles 269, 270 and 271. Movement of the control handle 269 is operative to connect the pump discharge 262 with a conduit 273 leading to the conduit 147 or with the conduit 274 leading to the conduit 148, and concurrently to connect the conduit 273 or 274 which is not supplying fluid to the carriage feed motor 126, with the return conduit 164. This valve mechanism can thus effect (a) a slow feeding rate of the carriage by delivering only the output of the small-displacement pump 151' to the motor 126, or it may (b) interrupt the supply of fluid from the small-displacement pump 151' to the feed motor 126, and it may (c) effect reverse feed at a slow rate. The handle 270 controls the supply of fluid alternatively to the conduits 223 and 224 leading to the cylinder 220. In order to prevent excessive clutch pressure a relief valve controlled return line 276 will allow fluid to return to the tank 246 when the pressure in the conduit 224 exceeds a desired value. The handle 271 controls the supply and release of fluid through a conduit 277, which connects with the lift cylinder connections 106.

Conduit 262 has a branch 280 which leads to the valve box of unit 245. A drain line 278 leads back from this valve box to the conduit 265 and to the reservoir 246. This valve box 245 includes a supply box 281, a return connection box 282 and five valve boxes 283, 284, 285, 286 and 287. Associated with each valve box is a control handle—these being numbered in the same sequence as the valve boxes were enumerated—291, 292, 293, 294 and 295. Under the control of the handle 291, fluid may be supplied to conduits 301 and 302 alternatively to the opposite ends of the leveling jack 51, or this jack may be cut off both from supply and from the return line to the reservoir. Under the control of the handle 292, a supply and venting of fluid may take place with respect to conduits 303 and 304 leading to the leveling jack 52 or this jack may have its conduits closed off. Conduits 305 and 306 lead to the leveling jack 53 and the connection of these conduits with respect to supply and exhaust is controlled by the handle 293. Conduits 307 and 308 lead to the leveling jack 54, and the connection of these with respect to supply and exhaust is controlled by the handle 294. Handle 295 controls the supply and discharge of fluid through conduits 309 and 310 to the winch driving motor 228, so that this may be operated to wind in or to pay out the cable 230. A drain line 311 leads from the motor 228 to the conduit 276. Since the pump 151 is on the movable carriage many of the conduits described will be of the flexible type. Any suitable control switch mechanism for the motor 84, may be housed in a control box 312.

From what has been described, the mode of operation of the illustrative embodiment of the invention will be readily understood. The apparatus will be brought to the desired position for the starting of a hole by movement of the face plate 21, as, for example, but without limitation thereto, by haulage ropes or cables appropriately drawn in by power or by front and back transversely acting, push ro pull type jacks—if desired supplied wtih hydraulic fluid from the hydraulic system of the apparatus, or by other suitable means. These means can be used, of course, for movement of the entire apparatus not only from hole to hole along one entry, but for moving it from one entry to another, etc. The direction in horizontal planes of the hole will be determined by the operation of the jack devices or wall jacks 231 and 232. The drill and conveyor screw drive motor, being at the extreme back end of the main frame, the swingably mounted rack-bar 26'b and supporting bar 23'b will be swung outwardly, in order that a section of conveyor with a drilling head supported at its forward end may be rolled into position. The winch 226 may be used for this purpose, if desired. By the proper supply or venting of fluid from the lift cylinders 94, the drive sleeve 14 may be brought into proper relation vertically with respect to the connection, at the pin portion 13, of the section 10, which then rests on the base or bottom plate 21. This may desirably be preceded by closing the gate of the rack-bar 23' and the insertion of the pin 43 in position to lock the members 23'b and 26'b in proper relation to the base 21, and adjustment of the jacks 51, 52, 53 and 54 if necessary to bring the plane of the rack-ways to desired position.

Fluid may be supplied, desirably from the small-displacement pump, to inch the drive sleeve into desired relation with the section of conveyor screw which rests upon the platform provided by the bottom plate 21. Thereafter when the driving connection has been established, the lift cylinders may raise the section to the desired elevation, either for the starting of the hole, if a new one is about to be started, or for connection with the section previously advanced into the face. The possible adjustment is illustrated in broken lines in Fig. 13. When everything is ready for initiation, or continuation, as the case may be, of the drilling operation, the drill feeding motor 126 may be supplied with fluid to rotate it in a forward feed direction. It will be understood that the shaft 10 will have been started rotating in the proper direction by the appropriate shifting of the clutch element 178 and by the braking of the internal gear 195. The hole will then be deepened and coal will be brought out and deposited on the conveyor 5 and carried away. When the hole reaches the desired depth two procedures may be resorted to: either a completely new set of drilling and conveying units may be employed for the formation of an adjacent hole while the set of drilling and conveyor sections in the hole, having been cleared of coal, are progressively successively pulled out, as by the use of the winch, and separated; or, a single set of conveyor sections with drilling head may be employed, with the resultant necessity for completely separating them before the next hole can be started. If the series of holes be formed progressively in a direction opposite that indicated in Figure 1, it will be possible to use the rearward feed of the carriage through a cable suitably attached to the carriage and to the drill and conveyor, for the progressive withdrawal of the drill and conveyor.

It will be evident that we have provided an improved mining apparatus having improved means for effecting its operation and adjustment and assembly of its working implements, that the parts are simple, that they lend themselves to ready manipulation and control, and that they are unlikely to be injured in use.

While there is in this application specifically described one form which the invention may assume in practice, it will be understood that this form of the same is shown for purposes of illustration and that the invention may be modified and embodied in various other forms without departing from its spirit or the scope of the appended claims.

What we claim, and desire to secure by Letters Patent is:

1. In an apparatus of the character described, a base, racks extending along said base, a carriage movable along said base and carrying pinions engageable with said racks, driving means for said pinions, a drive sleeve, supporting and rotating means for said drive sleeve mounted on said carriage for upward and downward movement about a pivot axis laterally remote from the axis of rotation of said drive sleeve and extending longitudinally of said base adjacent one side edge thereof, said carriage movable along said racks to a retracted position on said base in which space is available ahead of said drive sleeve for a screw conveyor section to be arranged on said base forwardly of said drive sleeve, and one of said racks having a portion pivotally mounted and swingable aside to provide a path for the rolling of such a section over an edge of said base, said supporting and rotating means for said drive sleeve positionable by movement about said axis in alinement with the axis of said screw conveyor section as the latter rests upon said base.

2. In an apparatus of the character described, a base, racks extending along said base, a carriage movable along said base and carrying pinions engageable with said racks, driving means for said pinions, a drive sleeve, supporting and rotating means for said drive sleeve mounted on said carriage for upward and downward movement thereon about a pivot axis laterally remote from the axis of rotation of said drive sleeve and extending longitudinally of said base adjacent one side edge thereof, jack devices remote from the free end of said supporting and rotating means for raising the latter about said pivot, said carriage movable to a retracted position on said base in which space is available ahead of said drive sleeve for a screw conveyor section to be arranged on said base forwardly of said drive sleeve, one of said racks having a portion pivotally mounted and swingable aside to provide a path for the rolling of such a section over an edge of said base, said supporting and rotating means for said drive sleeve positionable by movement about said axis in alinement with the axis of said screw conveyor section as the latter rests with its lower side in contact with said base.

References Cited in the file of this patent

UNITED STATES PATENTS

| | | |
|---|---|---|
| 1,113,277 | Zelenay | Oct. 13, 1914 |
| 1,310,274 | Branning | July 15, 1919 |
| 1,894,446 | McKenny | Jan. 17, 1933 |
| 2,001,502 | Satre | May 14, 1935 |
| 2,060,814 | Lewis | Nov. 17, 1936 |
| 2,169,424 | Levin | Aug. 15, 1939 |
| 2,196,260 | Gatto | Apr. 9, 1940 |
| 2,319,512 | Parrish | May 18, 1943 |
| 2,330,437 | Lovely | Sept. 28, 1943 |
| 2,338,351 | Parrish | Jan. 4, 1944 |
| 2,348,024 | Parrish | May 2, 1944 |
| 2,394,194 | McCarthy | Feb. 5, 1946 |